United States Patent
Hullin et al.

(10) Patent No.: US 7,123,834 B2
(45) Date of Patent: Oct. 17, 2006

(54) TRANSMISSION SYSTEM AND METHOD FOR EQUALIZATION OF CHANNELS IN THE SYSTEM

(75) Inventors: Cyril Hullin, Paris (FR); Eric Grand, Paris (FR); Céline Heerdt, Massy (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/001,066

(22) Filed: Dec. 2, 2004

(65) Prior Publication Data
US 2005/0123295 A1   Jun. 9, 2005

(30) Foreign Application Priority Data
Dec. 4, 2003   (EP) ................. 03 293 041

(51) Int. Cl.
H04B 10/08   (2006.01)
H04B 10/00   (2006.01)
H04B 10/04   (2006.01)
H04J 14/02   (2006.01)

(52) U.S. Cl. ............... 398/33; 398/94; 398/162; 398/197

(58) Field of Classification Search ............... 398/25, 398/33, 93–95, 158, 160, 162, 195, 196–198, 398/208–210, 177; 359/333.11, 333.12, 359/333.13
See application file for complete search history.

(56) References Cited

U.S. PATENT DOCUMENTS

| | | | |
|---|---|---|---|
| 5,225,922 A | 7/1993 | Chraplyvy et al. | |
| 6,040,933 A * | 3/2000 | Khaleghi et al. | 398/1 |
| 6,275,313 B1 * | 8/2001 | Denkin et al. | 398/9 |
| 6,445,471 B1 | 9/2002 | Shimokawa et al. | |
| 6,563,614 B1 | 5/2003 | Stephens et al. | |
| 6,701,089 B1 * | 3/2004 | Goodwin et al. | 398/79 |
| 2002/0054648 A1 | 5/2002 | Krummrich et al. | |
| 2002/0097480 A1 * | 7/2002 | Dominic et al. | 359/333 |
| 2003/0223747 A1 * | 12/2003 | Olier et al. | 398/43 |

FOREIGN PATENT DOCUMENTS

EP   1 292 056 A2   3/2003

* cited by examiner

Primary Examiner—Dalzid Singh
(74) Attorney, Agent, or Firm—Sughrue Mion, PLLC

(57) ABSTRACT

The invention is related to a method for equalizing performance of traffic channels in a WDM system where means for controlling transmitters (12), amplifiers (38) and receivers (14) are provided. Potentially, a number of channels are defined as loading channels (100). The method follows the steps of measuring the optical power at the input (48) of the amplifier (38), setting the power levels of a predefined number of loading channels (100) to a high power level, setting the power level of the traffic channels (200) to a power level less then the power level of the loading channels (100), adjusting the power level of the traffic channels (200), adjusting the power level of the loading channels (100), stabilizing the sum of the optical power measured at the optical amplifier (38), continuing the process for each channel the receiver lock signal (75) is sent back to the transmitters.

7 Claims, 3 Drawing Sheets

TRANSMISSION SYSTEM AND METHOD FOR EQUALIZATION OF CHANNELS IN THE SYSTEM

BACKGROUND OF THE INVENTION

The invention is based on a priority application EP 03 293 041.4 which is hereby incorporated by reference.

Wavelength division multiplexing (WDM) is a technique employed in high capacity optical transmission networks to increase their information carrying capacity. WDM systems transmit a plurality of channels, each at a different wavelength, over a single optical fiber. Typically, a WDM system comprises N optical transmitters for optically transmitting N channels of information, a wavelength multiplexer for combining the N channels on one optical fiber, optical amplifiers connected in series by optical fiber cable, a wavelength demultiplexer for separating the optical signal into N channels, and N receivers for detecting the information carried by the N channels. In network configurations having an add-drop multiplexer, the multiplexer is located at a position along the path of the serially connected amplifiers. The add-drop multiplexer is capable of extracting a channel from the network for directing it to an alternative receiver and may also insert into the network a new channel transmitted at the same wavelength as the extracted channel.

Performance of WDM systems is related to the optical signal to noise ratio (OSNR) at the receiver (among other things such as non accumulated non linear effects, or chromatic dispersion). Due to wavelength dependent gain profiles, noise profiles and saturation characteristics of the optical amplifiers and wavelength dependent gain of other components in the optical path, channel OSNR values at the receiver will be unequal for equal transmitter optical power levels. U.S. Pat. No. 5,225,922 Chraplyvy et al discloses a method for equalizing channel performances in point-to-point WDM systems using the optical power level of each channel transmitter and the OSNR measured at each channel receiver. New transmitter optical power levels for each channel are calculated from the optical power level and OSNR values using a specified formula. The channels' transmitters are then set to the new optical power levels. This process is repeated until the difference between the channel's OSNRs is within a predetermined range. Although this method can equalize the OSNR at the receivers within a few iterations, it requires the use of expensive instruments such as an optical spectrum analyzer to measure the OSNRs at the receivers. A further disadvantage of this method is that it is not easily adaptable to more complex optical network configurations such as those having an add-drop multiplexer. It appears that it would be advantageous to provide a less expensive and more flexible method of equalizing channel performance in WDM systems that is capable of equalizing performance in more complex networks such as those having an add-drop multiplexer.

U.S. Pat. No. 6,040,933 discloses a method and apparatus for channel performance equalization in wavelength division multiplexed (WDM) systems. The channel performance is estimated from from the optical power measurement of each transmitted signal. The measurements are taken at the inputs of the first optical amplifiers in the transmission path of the system. The channels are equalized by adjusting the optical power of the channel transmitters. The method is applicable to point-to-point networks as well as more complex network configurations such as those having an add-drop multiplexer (ADM) for inserting and extracting channels from the transmission path. The method can compensate for signals having different bit rates by applying an offset to the amount of optical power adjustment of the channel transmitters.

Furthermore, if different types of optical amplifiers are used in the transmission path, the method can accommodate different noise characteristics of the amplifiers by using their noise figures in determining the amount of optical power adjustment of the transmitters that is required to equalize channel performances.

This method is applicable for a new installation of a system but not for upgrading a system by channel provisioning.

Another way to measure performance of channels is disclosed in U.S. Pat. No. 6,445,471. In this prior art attenuating channels to set a uniform characteristic optimizes the system selected method. The channel's error rate is the relevant criterion to quantify the signal' quality. The measured error rate at the receiver is the relevant value to react on the channels. Bit error measurement is one possibility described. This system needs additional attenuating means and cannot be easily upgraded.

SUMMARY OF THE INVENTION

It is an object of the present invention to provide improved method for channel performance equalization and optimization in WDM systems and a transmission system that reduce or overcome some or all of the disadvantages of the techniques described above.

An advantage of this aspect of the invention is that it provides a method for equalizing channels in terms of pure transmission quality in a WDM system with a simple process based on channel BER or BER derived criterion.

Furthermore, the method may be performed dynamically and may therefore be responsive to changes in channel performance that could for example be due to changes in the WDM system caused by fault conditions or by network reconfigurations.

BRIEF DESCRIPTION OF THE DRAWINGS

The invention is described in the figures and its description follows:

FIG. 1 is a block diagram of a WDM system 10 according to an embodiment of the present invention. The WDM system comprises a transmitter terminal 12, a receiver terminal 14, a transmission path 16 and a network monitor 18. The transmitter terminal 12 comprises four optical transmitters 20, a wavelength multiplexer 22 and optical fibers 24. Each transmitter 20 has an input 28, an output 32 and control input 30 for controlling the optical power of the output 32. The wavelength multiplexer 22 has inputs 34 and an output 36. Each transmitter output 32 is connected to a respective wavelength multiplexer input 34 by an optical fiber 24. The wavelength multiplexer output 36 is connected to an amplifier 38 and to transmission path 16 by optical fiber 48. The transmission path 16 comprises further optical amplifiers 39 and optical fiber cable 40. The optical amplifier 38 has an input 42, an output 44 and a data output 46 for providing a measurement of the optical signal power at the input 42. The optical amplifiers 39 are serially connected by optical fiber cable 40. The receiver terminal 14 comprises a wavelength demultiplexer 50, four optical receivers 52 and optical fiber 54. The wavelength demultiplexer 50 has an input 64 and outputs 62. Each optical receiver 52 has an input an output 58 and an data output 75. Each receiver input 56 is connected to a respective wavelength demultiplexer output 62 by an optical fiber 54. The wavelength demultiplexer input 64 is connected to transmission path 16 by optical fiber 68. The network monitor 18 has inputs 70, 75 and an output 72. The network monitor input 70 is connected to a respective optical amplifier data output 46 by network links 74. The network monitor 18 is connected with the respective receiver output 75. The network monitor output 72 is connected to optical transmitter control inputs 30. In operation, information signals UCI1 to UCI4 are applied to inputs 28 of optical transmitters 20. The optical transmitters' 20 output optical signals s1 to s4 which correspond to wavelengths $\lambda 1$ to $\lambda 4$ are modulated by information signals UCI1 to UCI4 respectively. Wavelengths $\lambda 1$ to $\lambda 4$ correspond to channels c1 to c4 respectively.

Figure 1:
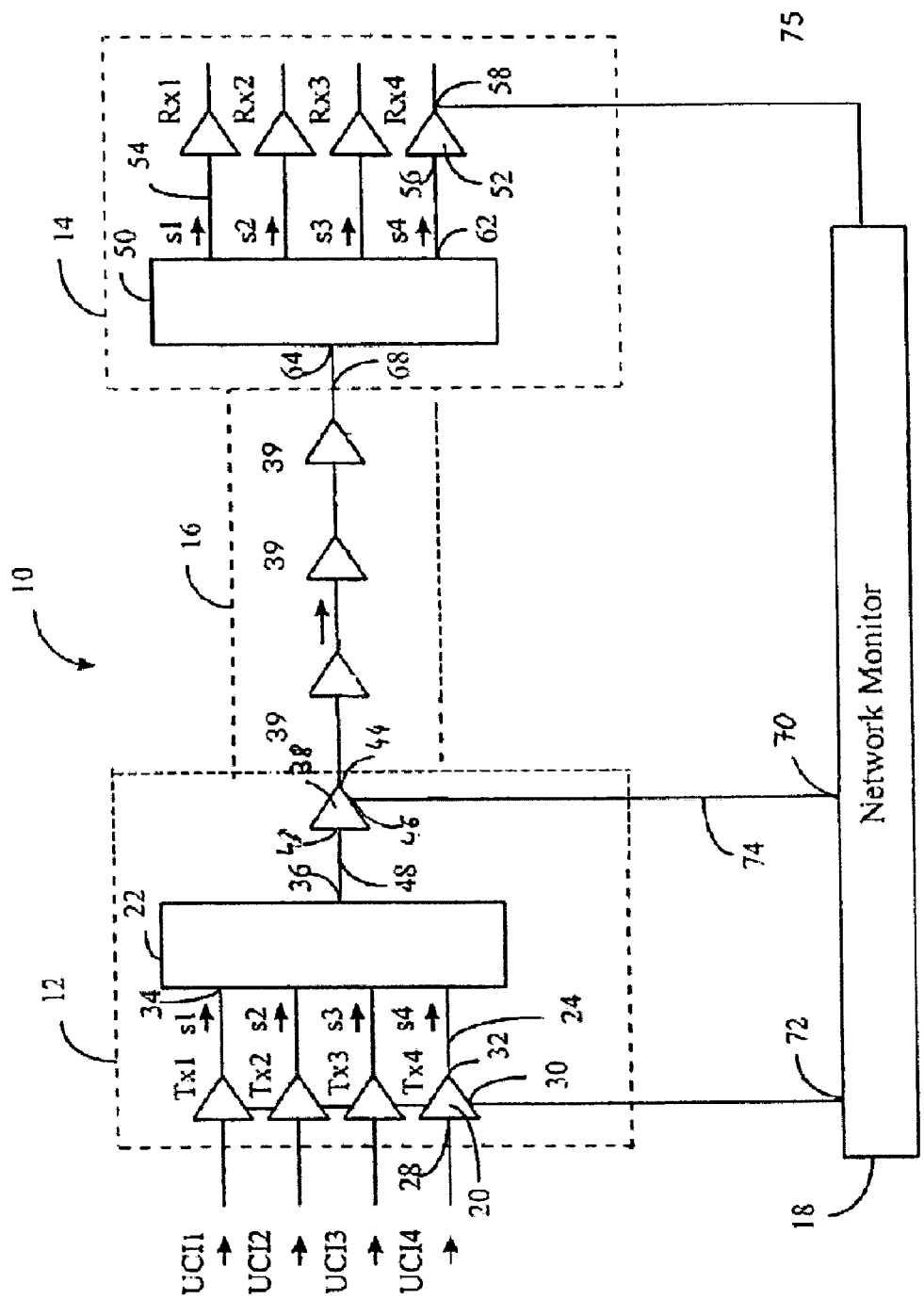
FIG. 1 shows a schematic WDM system

The wavelength multiplexer 22 combines the optical signals s1 to s4 applied to the multiplexer inputs 34 and outputs a combined optical signal S at the multiplexer output 36. Combined signal S is transmitted to the receiver terminal 14 by transmission path 16. The optical amplifier 38 amplifies the signal applied to its input 42 by an amount of gain, which is dependent upon wavelength and provides a signal at its output 44 whereby the optical power of the output signal equals the gain times the optical power of the input signal. Since the amount of gain is dependent upon wavelength, each channel of combined optical signal S is amplified by a different amount of gain.

Examples of optical amplifiers are semiconductor optical amplifiers and rare earth doped fiber amplifiers. Optical amplifiers add noise to the system, typically in the form of amplified spontaneous emission (ASE), so that the optical signal to noise ratio (OSNR) is degraded at each amplifier site. The OSNR is defined as the ratio of signal optical power to the ASE noise power in a reference optical bandwidth. Almost all optical amplifiers exhibit a non-uniform wavelength dependent gain profile, noise profile, and saturation characteristics. These characteristics along with wavelength dependent loss of other components in the system results in unequal OSNRs of the channels for equal transmitter optical power levels. Bit error rate (BER) is a typical performance parameter for digital transmission systems such as optical WDM systems. BER can be determined for each channel in a transmission system and is partially related to OSNR for optical transmission systems. The BER of the channels may be equalized by adjusting the optical power level of the transmitters. However, if the signals transmitted by their respective channels have different bit rates, signal qualities, or amounts of distortion, then these factors should be taken into account in combination with the OSNRs as part of the equalization process.

Until now, the most common method to turn on transmission systems is to light up all channels to their maximum power in parallel. The turn on process is applied on all traffic channels. After turn on process all channels are equalized to the lowest OSNR. Concerning the upgrade process, the channel powers are increased gradually until having a correct OSNR. To finalize the process, an equalization procedure based on BER reading is started up.

The OSNR based solution required an OSNR measurement, which is a complicated measurement requiring specific equipment. This measurement is not cost effective nore time effective. Moreover for systems including optical Add-Drop-Multiplexers OADMs, the OSNR method is not always applicable, nor when the channel spacing does not allow an OSNR measurement (25 Ghz spacing for example).

Figure 2:
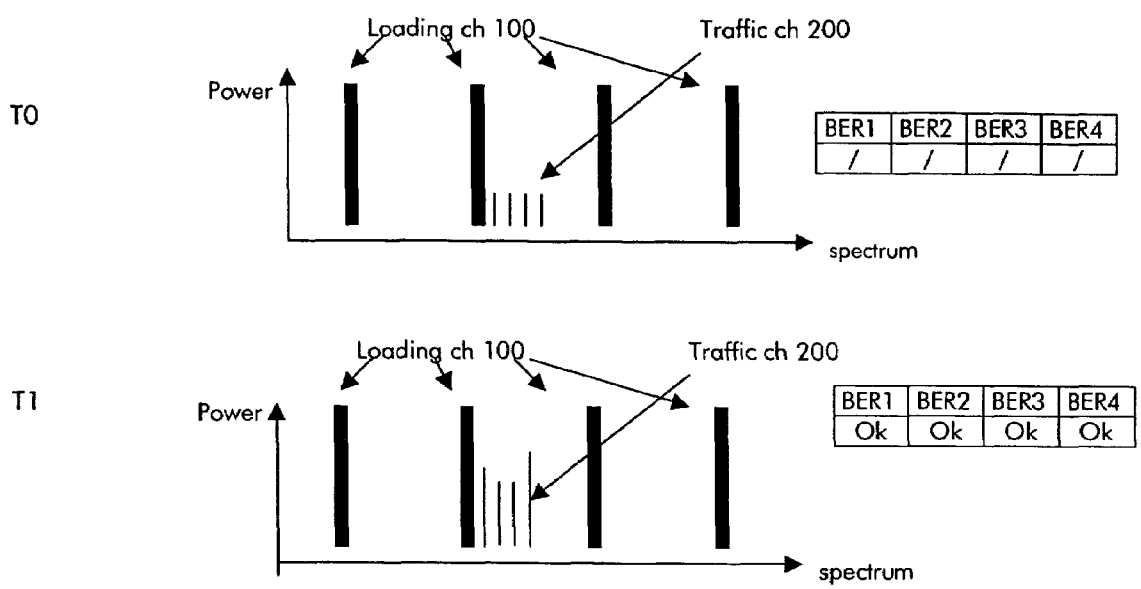
FIG. 2 shows a scheme of channels allocation

The principle of the invention is explained in FIG. 2. Before starting the system a number of channels equidistant to each other's are defined. These channels laying at selected wavelengths are channels in the normal WDM grid. The special channels are defined as loading channels 100. The loading channels can also be additional channels not in the wavelengths of the WDM grid. The channels used to transmit data are traffic channels 200.

In case of an upgrade of the system the traffic channels can play the role of loading channels.

For a system with a few channels, the loading channels are turned on with a flat power profile at a certain power in order to provide the nominal input power to the amplifier 38. The loading channels 100 are marked as black bars.

The new traffic channels or upgrade channels are turned on at a power level far below the loading channels' level. The power level difference is about 15 dB when starting the system for example. Then, the new or upgrade channels are pushed up by 1 dB steps for example until the receiver locks, while the loading channels' power is decreased in order to maintain a constant amplifier input power.

This BER based procedure enables an individual coarse channel tuning which adapts the transmitter power of each channel to the amount of non linear effects, chromatic dispersion seen by the channel and its resulting OSNR.

The principle is to increase step by step the power of the channels to install until the receiver locks. When it locks, a flag is sent back to the transmitter to stop the power increase. The receiver lock signal is derived from the BER measurement in the receiver and is sent when the receiver receives a data stream, which can be successfully analyzed. It can be used for a first installation of a system or for channel count upgrades. For complex networks containing OADMs, this methods simplifies the channels' start up and presents great advantages in terms of simplicity compared to existing methods.

First the following process (system start up case) is applied for low channel counts then the number of channels is increased by applying the second process (upgrade case).

Figure 3:
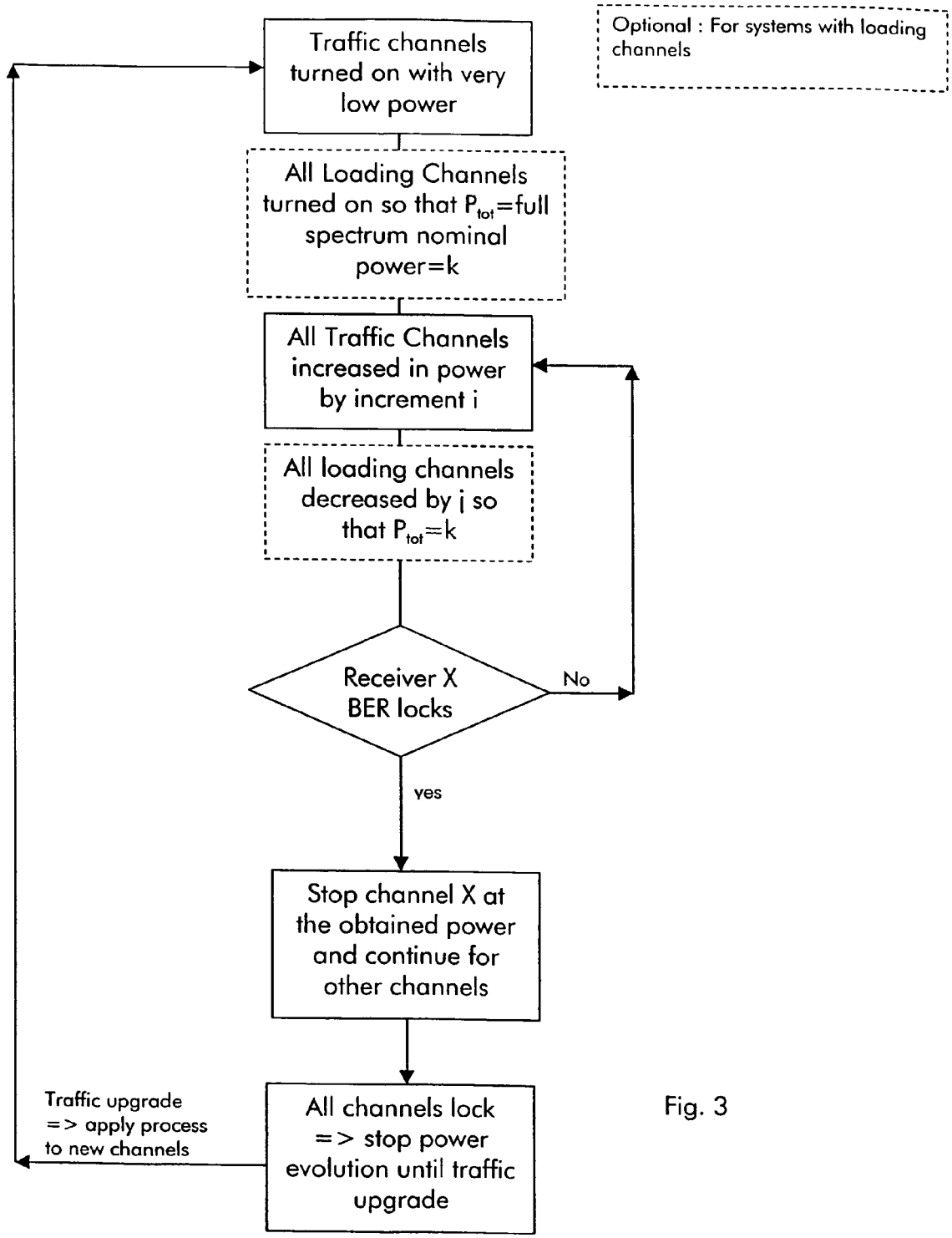
FIG. 3 is a process chart for a new installation

The case of a system first start up is following the procedure described in FIG. 3.

All traffic channels are turned on and set to a very low power more than 15 dB lower than the loading channels for example. Also this turn on signal comes from the network monitor and the link 30 to the transmitter Tx. The output signal 46 of the amplifier 38 gives the information about input power level and gain. The input power must have a definite level for the sum of all active channels. The input signal is derived by the link 74 from the amplifier 38. The network monitor checks the measured value and runs the next steps for the start up procedure.

All loading channels 100 are turned on to load the system's amplifiers. The amplifiers can only perform well when a sufficient input signal 48 is provided. The amplifier stabilization is not in the scope of this invention but the amplifier automatic gain control must be established before starting the system. The turn on signal is initiated by the network monitor 18 and the link 30 to the transmitters Tx. The parameter that is measures is the full spectrum power $P_{tot}$. This parameter must have a value k.

All traffic channels 200 are increased in power all at the same time by XdB usually 1 dB steps. Parallel all loading channels are decreased by j so that in a result the full spectrum power $P_{tot}$ remains constant at the value k. This is controlled in the network monitor and the respective control signals are sent to the transmitters Tx.

This process is run until the receiver Rx for one traffic channel locks. The locking signals is sent from the receiver Rx to the network monitor 18. The signals are dependent from the status of the receiver. The locking signal is defined to be sent when the proper BER is obtained. An alternative signal is derived from a successful locking of the FEC Forward Error Correction mean.

When the receiver locks, it sends the information that it detects a new channels to the network monitor and to the corresponding transmitter and the power increase in the corresponding transmitter is stopped. The process then continues for the other channels.

When all channels are locked, another fine tuning algorithm is applied.

In case of a channel upgrade of a system already running (upgrade case):

New working channels start up

Turn the new channel on with a power much lower (10 dB for example) than the lowest already working channel's power.

Increase the power of the new traffic channel by 1 dB steps for example until the receiver or the FEC locks. Between each power rise, the loading channels' powers are adjusted in order to maintain constant the input power to the amplifier.

When the receiver locks, the power increase is stopped for the newly installed channels and then run another fine tuning algorithm to equalized the BER.

The upgrading process is running any time a channels is added to the WDM grid. The process is easy to implement in existing systems and allows an upgrade of systems without any traffic interruption.

The invention claimed is:

1. A method for equalizing and optimizing performance of channels in a wavelength division multiplexing (WDM) system comprising a plurality of transmitters for outputting signals on the channels, a network monitor for controlling the transmitters, at least one amplifier for amplifying the signals, and a plurality of receivers for receiving the signals, wherein the channels comprise traffic channels and loading channels, the method comprising the steps:

measuring a full spectral power at an input of the amplifier;

setting power levels of the traffic channels to a first power level;

setting power levels of the loading channels to a second power level which is greater than the first power level;

incrementally increasing the power levels of the traffic channels while incrementally decreasing the power levels of the loading channels so that the full spectral power remains at a constant level; and stopping the incremental increasing of the power level of a traffic channel upon reception of a lock signal from a receiver corresponding to the traffic channel or when a received signal of the traffic channel is compliant with the customer requirement.

2. The method according claim 1, wherein the second power level is at least 10 dB greater than the first power level.

3. The method according claim 1, wherein the network monitor controls the power levels of the channels.

4. The method according claim 1, wherein the power levels of the traffic channels are increased in predetermined increments.

5. The method according claim 1, wherein the lock signal is derived from measuring a bit error rate at the respective receiver.

6. A network monitor for a WDM system for adjusting and optimizing channel performance in a wavelength division multiplexing (WDM) system comprising a plurality of transmitters for outputting signals on a plurality of channels, at least one amplifier for amplifying the signals, and a plurality of receivers for receiving the signals, wherein the channels comprise traffic channels and loading channels, the network monitor comprising:

receiving means for receiving power measurement data of an input of the optical amplifier;

calculating means for calculating an amount of transmission power adjustment for the loading and traffic channels based on power measurement data;

communication means for sending control signals to the transmitters of the system based on calculation results from the calculating means; and receiving means for receiving lock signals of the receivers;

wherein the network monitor initially sets power levels of the traffic channels to a first power level and power levels of the loading channels to a second power level which is greater than the first power level, then incrementally increases the power levels of the traffic channels while incrementally decreasing the power levels of the loading channels so that a full spectral power of the channels remains at a constant level, and stops the incremental increasing of the power level of a traffic channel upon reception of a lock signal from a receiver corresponding to the traffic channel or when a received signal of the traffic channel is compliant with the customer requirement.

7. A transmission system for transmitting data via optical links with transmitters and receivers and a network monitor using a WDM scheme with a network monitor according claim 6.

* * * * *